United States Patent Office 3,457,061
Patented July 22, 1969

3,457,061
UTILIZATION OF PHOSPHORIC ACID SLUDGE
Marion D. Sanders, Dune Acres, Ind., and Joseph Kealy,
Calumet City, Ill., assignors to Swift & Company,
Chicago, Ill., a corporation of Illinois
No Drawing. Filed Mar. 29, 1965, Ser. No. 443,644
Int. Cl. C05b 11/08
U.S. Cl. 71—40                                    5 Claims

ABSTRACT OF THE DISCLOSURE

Evaporator sludge, as distinguished from digestor sludge, formed during the manufacture of wet-process phophoric acid is converted into a valuable phosphatic granulating reagent adapted for use in the production of plant foods. The normally solid evaporator sludge is rendered pumpable by the steps of diluting said sludge which contains about 42–54% $P_2O_5$ with 1 part sulfuric acid for about 0.9–3.1 parts sludge, of agitating the mixture of sludge and sulfuric acid, and of cooling the mixture to a temperature not substantially in excess of 100° F. in less than 5 hours to produce a pumpable viscosity of said sludge of at least about 200 centipoises at 105° F. but not substantially in excess of 500 centipoises at 60° F.

---

This invention relates to improvements in the manufacture of phosphatic products and more particularly to improvements in the production of phosphoric acid and valuable new products derived therefrom.

"Wet Process" phosphoric acid is obtained by the acidulation of phosphate containing rock with an inorganic acid. The rock is first ground and premixed with phosphoric acid to form a slurry. The slurry is then passed to a digester where sulfuric acid is added, and the mixture agitated. Cooling of the mixture is achieved by vacuum cooling or passing large volumes of air into the digester. Sulfuric acid reacts with the impure mineral apatite of the rock to form a mixture consisting substantially of gypsum and dilute phosphoric acid. The insoluble gypsum is then filtered, centrifuged or allowed to settle from the dilute acid which has a concentration of about 25–35% $P_2O_5$. The insoluble gypsum sludge is predominantly composed of calcium sulfate.

The gypsum-free dilute acid from the digester operation is then passed to an evaporator where water and other volatilizable materials are removed as the acid is concentrated to a substantially higher $P_2O_5$ content. This dilute acid contains many impurities which remain in solution while the acid is in a dilute state, but tend to precipitate as the acid is concentrated. Thus as the acid is concentrated by evaporation to a $P_2O_5$ content of 52–54% or higher, insoluble solids of aluminum, iron magnesium and calcium as well as other salts precipitate out of solution. The resulting concentrated phosphoric acid containing solids is then centrifuged or settled to promote separation between these precipitated solids and the concentrated phosphoric acid. The settings or sludge is a mass which is neither palpably dry nor yet completely liquid. It is referred to herein as "evaporator sludge" to distinguish this material from the digestor sludge described previously.

"Evaporator sludge" is characterized as a muddy or slushy mass or sediment which is too thick to pump, and thus is not readily handled or transported. These factors have caused this material to be of limited utility and value. Nevertheless, evaporator sludge or mud is of considerable intrinsic value, because of the high prosphoric acid content of this sludge. It is distingiushed from digestor sludge in that it usually contains substantially less gypsum than digestor sludge which is composed predominantly of gypsum. Evaporator sludge on the other hand, ordinarily will not contain more than about 10% gypsum and usually not in excess of about 30% gypsum on a weight basis.

A principal object of this invention is to provide a method for improving the handling characteristics of evaporator sludge while retaining the desirable chemical properties of such sludge.

Another object of this invention is to convert evaporator sludge, normally too thick for pumping, into a valuable plant food granulating assistant comprising a fluid dispersion of a limited amount of insoluble impurities in phosphoric acid.

Still another object of the invention is to provide a method for producing from a wet process phosphoric acid by-product a valuable phosphatic granulating reagent adapted for use in the production of plant foods.

Yet another object of the invention is to provide a method for treating highly viscous evaporator sludge to suspend undissolved solids in said sludge while maintaining a viscosity sufficiently low to permit handling of the sludge through conventional pumping equipment.

Additional objects of the invention, if not specifically set forth herein, will be readily apparent to those skilled in the art from the detailed description of the invention which follows.

Generally the method of the invention comprises the treatment and handling of evaporator sludge derived from the manufacture of phosphoric acid by the wet process to convert the sludge into a valuable phosphatic plant food granulating ingredient. The method involves conversion of the sludge from a high solids, substantially unpumpable by-product, to a lower solids pumpable material having sufficient viscosity to insure that the insoluble materials are suspended therein. The sludge which before treatment may contain as much as 60% undissolved solids is treated with a strong mineral acid to reduce the solids content thereof, yet the treatment is carried out so as to insure that a certain amount of solids will be retained in the sludge and will be suspended substantially uniformly throughout said sludge. It is thus possible to convert the sludge from an unmerchantable moist mass which is neither palpably dry not yet completely fluid into a smoth flowing fluid having a significant quantity of suspended solids. The smooth flowing fluid can then be used to supply the phosphatic component in the granulation of plant foods.

More specifically the invention includes the treatment of evaporator sludge with an inorganic acid, such as sulfuric acid to dissolve and suspend sludge solids in the fluid component of the sludge. The treatment is carried out under conditions which insure that a substantial portion of the solids of the sludge is dissolved in the liquid acid and the remaining undissolved solids are suspended uniformly in the liquid. Protection against setting out of undissolved solids in the treated sludge appears to be attributable to maintenance of a certain viscosity range in the fluid. The resulting fluidized sludge can be used to advantage in place of wet process phosphoric acid in plant food granulation operations. The fluidized sludge contains less water and therefore is more economical to ship than wet process acid; the fluidized sludge provides a drier granulated product than conventional wet process acid allowing for reduction of drying costs and the fluidized sludge can be used more efficiently in conventional granulating equipment.

The viscosity of the thick unpumpable evaporator sludge is reduced by adding to the sludge which contains about 30–60% undissolved solids a strong mineral acid preferably concentrated sulfuric acid in an amount sufficient to reduce the viscosity of the sludge to not substantially in excess of 500 centipoises at 60° F. The amount of acid added, however, is insufficient to reduce the viscosity below about 200 centipoises at 105° F. in order to insure that undissolved solids remain suspended. After addition of the acid to the sludge which usually contains less than about 10% calcium sulfate, assuming that separation of digestor acid from the gypsum sludge has been reasonably efficient and no mishaps such as breaking of filters has occurred, is followed by cooling of the mixture. Prompt cooling is desired to insure that solids will be suspended in the modified sludge.

It has been found in accordance with the invention that evaporator sludge is converted to a pumpable useful form by adding one part of sulfuric acid to about 0.9 to 3.1 parts by weight of the sludge followed by rapid mixing to form a hot slurry. Cooling of the mixture to less than about 100° F. must be carried out in less than about 5 hours. The mixing temperature after concentrated sulfuric acid is added to the sludge is preferably in the range of 100–150° F. and the solids content of the sludge is reduced to no more than about 15–18% undissolved solids and preferably less than about 16% undissolved solids.

Evaporator sludge which can be derived as the underflow from the centrifuge after removal of 52% $P_2O_5$ or more concentrated phosphoric acid from the evaporator, or the sludge resulting when 52% $P_2O_5$ or more concentrated acid is decanted after evaporation is a muddy or slushy sediment difficult to pump. However, the mud or sludge is of considerable value because of the phosphoric acid content thereof. The following table shows the constitution of three typical evaporator sludges obtained as byproducts in the manufacture of 52–54% $P_2O_5$ phosphoric acid. Sludge A is the residue remaining in the settling tank after removal of 54% $P_2O_5$ phosphoric acid from the tank; Sludge B is the underflow from the centrifuge after removal of 54% $P_2O_5$ phosphoric acid and sludge C was also obtained as the underflow from another 54% $P_2O_5$ phosphoric acid. All analyses are expressed on a weight percent basis.

| Sludge | $P_2O_5$ | $Al_2O_3$ | $Fe_2O_3$ | MgO | CaO | $SO_3$ | $H_2SO_4$ | $H_3PO_4$ (free) | Undissolved solids | $H_2O$ | F |
|---|---|---|---|---|---|---|---|---|---|---|---|
| A | 42.57 | 3.84 | 6.31 | 2.55 | 3.95 | 7.48 | 2.04 | 28.54 | 47.03 | 11.32 | 6.74 |
| B | 42.45 | 4.85 | 7.98 | 2.26 | 3.69 | 7.90 | 3.44 | 30.35 | 52.68 | 9.73 | 6.11 |
| C | 45.50 | 4.19 | 8.36 | 1.95 | 3.15 | 6.29 | 2.42 | 33.24 | 51.24 | 10.70 | 5.37 |

The following examples are set forth herein merely for the purpose of illustrating specific embodiments of the invention.

Example I

Each of the sludges A, B and C were mixed with 93% sulfuric acid utilizing 0.9 part to 1 part acid; 1.4 parts sludge to 1 part acid and 2 parts sludge to 1 part acid by weight, and the mixture was agitated for 30 to 60 minutes while the temperature was 100°–150° F. The mixture in each case was then cooled in no less than about 5 hours to a temperature of about 90° F. Although the sludges before treatment were impossible to pump using conventional centrifugal type pumps, the sulfuric acid modified sludges are stable fluids which can be handled by ordinary pumping equipment and can be used in granulator-ammoniator equipment as a granulating agent and as a fixation agent for liquid or gaseous ammonia. After treatment with the concentrated sulfuric acid the sludges analyzed as follows:

| Modified sludge | $P_2O_5$ | $H_2SO_4$ | Free $H_3PO_4$ | Undissolved solids | $H_2O$ |
|---|---|---|---|---|---|
| A | 20.26 | 43.26 | | 15.56 | 10.47 |
| B | 24.85 | 37.16 | 31.09 | 12.71 | 11.63 |
| C | 31.61 | 26.83 | | 14.61 | 12.44 |

Although the sulfuric acid modified sludge in each case contains a significant quantity of undissolved solids and it would be expected that these undissolved solids would settle out and clog outlet pipes and pumps in storage tanks, these sludges in fact do not exhibit this shortcoming. The solids are uniformly suspended in the fluid inasmuch as the fluid has a sufficiently high viscosity to maintain the uniform suspension. In addition, it appears that the growth and size of crystals is apparently impeded and limited by cooling of the mixture to a temperature of less than about 100° F. within a short time after addition of the sulfuric acid.

Example II

A continuous conversion of phosphoric acid sludge was effected by pumping 93% sulfuric acid into a 250 gallon tank at the rate of 22.6 pounds per minute and continuously introducing phosphoric acid sludge from the underflow of a centrifuge into the tank at the rate of 37.9 pounds per minute. Modified sludge was produced at the rate of about 60.5 pounds per minute and the product was continuously withdrawn from the tank so that the product remained in the tank for about 55 minutes at 150° F. to complete the reaction between the sulfuric acid and phosphoric acid sludge. Analysis for the feed sludge and modified sludge product are as follows:

| Product | $P_2O_5$ | $Al_2O_3$ | $Fe_2O_3$ | CaO | $SO_3$ | $H_2SO_4$ | $H_3PO_4$ | Undissolved solids | $H_2O$ | F |
|---|---|---|---|---|---|---|---|---|---|---|
| Feed sludge | 47.29 | 2.89 | 9.27 | 2.95 | 4.55 | 2.48 | 33.39 | 51.54 | 9.64 | 4.82 |
| Acid modified product | 30.07 | 1.63 | 6.14 | 1.82 | 31.77 | 31.44 | 36.21 | 9.34 | 10.83 | 2.45 |

Cooling of the product as it emanated from the tank was effected by immediately placing the product in tanks equipped with cooling coils and an agitator. Temperature of the contents in the storage tank reached 60° F. in about 4 hours. The storage tank was filled in 5 to 6 days and the product was then moved from the tank by pumping through an external shell and tube heat exchanger raising the temperature of the product to about 100° F. as the product was pumped into tank cars.

When received at a granulating plant 7 days later the contents of the tank car was at a temperature of 55° F. and about 0.6% of the total volume of the contents had settled out as solids. The viscosity of the product was 390 centipoises at 55° F. and at this viscosity there is no difficulty in pumping the product over a distance of about 50 feet or less. In one case where the fluid product had to be pumped for a distance of about 380 feet the viscosity was lowered by heating the product directly with live steam introduced directly into the unloading well pipe. This resulted in increasing the temperature from 55 to 92.5° F. in a few hours, with an attendant very slight dilution of the product. This dilution resulted in a lowering of the product values to $P_2O_5=29.42$, $H_2SO_4=30.76$ and undissolved solids=9.14.

The acid modified sludge of Example II was used to make a 5-20-20 grade fertilizer having a much lower water content than would result if conventional wet process phosphoric acid was used without the necessity for drying of the product. Better granulation of the plant food results utilizing the modified sludge of this invention as compared with sulfuric acid or phosphoric acid per se, as acid constituents in that the granules resolving from the utilization of the modified slude are harder and more roundly fused. In addition, since less water is contained in the modified sludge for equivalent combinations of phosphoric and sulfuric acid a much greater range of quantity of acid is possible in the formula permitting the optional addition of water as needed.

Example III

The product of Example II was used in preparing a granulated 5-20-20 fertilizer mixing 472 pounds per ton of this product with the following ingredients in the amounts noted:

| Ingredient: | Pounds/ton |
| --- | --- |
| Modified sludge | 472 |
| Anhydrous ammonia | 122 |
| Single superphosphate | 450 |
| Triple superphosphate | 379 |
| Muriate of potash | 656 |
| Water | 160 |

The finished mix left the granulator at 235° F. and after further drying contained 0.6% moisture, 4.95% total nitrogen, 19.88% available phosphoric acid and 20.15% potassium expressed as potassium oxide.

Screen analysis of the product was:

| Screen: | Amount (wt.) |
| --- | --- |
| +5 | 1.4 |
| −5+10 | 82.8 |
| −10+12 | 12.4 |
| −12+16 | 2.4 |
| −16+20 | 0.5 |
| −20 | 0.5 |

The invention in providing a method for converting a phosporic acid manufacture by-product into a merchantable fertilizer ingredient and granulating assistant provides a significant improvement in the economics associated with the production of phosphoric acid by the "wet-process." The modified sludge of the invention can be stored in mild steel inasmuch as the mixture of sludge and sulfuric acid exhibits a very low corrosion rate. Even at temperatures up to 200° F. the acid modified sludge causes corrosion only at the rate of 12 mils or less per year. In addition, the product, although it contains suspended solids does not even on long standing lose any substantial proportion of the suspended solids. Thus, settling does not exceed about 2% of the total volume stored even after storage for 30 days at temperatures of about 100° F. Thus the mixture composed predominantly of phosphoric acid, sulfuric acid, dissolved and suspended iron and aluminum phosphate gypsum and fluosilicates in addition to small amounts of other salts is an important and valuable chemical commodity having particular use in the production of plant foods.

We claim:
1. A method for treating wet-process phosphoric acid evaporator sludge to dissolve and suspend undissolved solids in the sludge fluid while maintaining a pumpable viscosity of said sludge of at least about 200 centipoises at 105° F. but not substantially in excess of 500 centipoises at 60° F., and comprising: diluting said sludge with sulfuric acid in an amount of about 1 part sulfuric acid for about 0.9–3.1 parts sludge, agitating the mixture of sludge and sulfuric acid, and cooling the mixture to a temperature not substantially in excess of about 100° F. within the period of less than about 5 hours.

2. A method of treating wet-process phosphoric acid evaporator sludge having a $P_2O_5$ content of about 42–54% $P_2O_5$ and containing incident metallic salt impurities, to prevent said impurities from forming a sediment in said acid when they settle out therefrom comprising: combining with said sludge about 1 part concentrated sulfuric acid for about 0.9–3.1 parts of said sludge, agitating the mixture of said sludge and said acid to promote dissolution of the solids of said sludge in said acid, and cooling the mixture thereof to a temperature not substantially in excess of about 100° F. after the solids content of said mixture becomes stable but within about 5 hours after said introduction of said acid, whereby there is maintained a pumpable viscosity of said sludge of at least about 200 centipoises at 105° F. but not substantially in excess of about 500 centipoises at 60° F.

3. A phosphatic slurry composition having utility as the phosphate supplying ingredient in the granulation of plant foods comprising modified evaporator sludge having the composition of about 20–40% $P_2O_5$, about 26–43% sulfuric acid, about 9–16% suspended solids, a viscosity of at least about 200 centipoises at 105° F. but not in excess of about 500 centipoises at 60° F., said suspended solids including predominantly aluminum, iron and calcium salts of strong mineral acids.

4. In the preparation of phosphatic plant food ingredients from phosphoric acid, wherein said phosphoric acid is reacted with another plant food ingredient in a granulating system to produce said phosphatic plant food ingredients, the improvement which comprises utilizing as the phosphoric acid ingredient the modified sludge recited in claim 3.

5. In the production of plant foods wherein nitrogen supplying source selected from the group consisting of ammonia, urea and ammonium salts and mixtures thereof is reacted with phosphoric acid to produce ammonium phosphate, the improvement which comprises utilizing as the phosphoric acid supplying ingredient the composition of claim 3.

References Cited

UNITED STATES PATENTS

| 2,954,287 | 9/1960 | Carothers et al. | 71—40 |
| 3,234,005 | 2/1966 | Smalter et al. | 71—29 |
| 3,313,614 | 4/1967 | Sharples et al. | 71—40 |

S. LEON BASHORE, Primary Examiner

E. R. FREEDMAN, Assistant Examiner

U.S. Cl. X.R.

71—37